United States Patent [19]
Hiruma

[11] 3,992,039
[45] Nov. 16, 1976

[54] SELF-LEVELLING VEHICLE SUSPENSION SYSTEM

[75] Inventor: Mituo Hiruma, Kodaira, Japan

[73] Assignee: Nissan Motor Company Limited, Yokohama, Japan

[22] Filed: Oct. 8, 1975

[21] Appl. No.: 620,841

[30] Foreign Application Priority Data
Oct. 14, 1974   Japan............................ 49-118436

[52] U.S. Cl................................ 280/703; 280/708; 267/65 D
[51] Int. Cl.²........................................ B60G 21/06
[58] Field of Search ........... 280/703, 104, 708, 6 H; 267/64, 65 D

[56] References Cited
UNITED STATES PATENTS
3,690,688   9/1972   Fleury................................ 280/708
3,884,496   5/1975   Ito...................................... 280/708

*Primary Examiner*—Philip Goodman

[57] ABSTRACT

A self-levelling vehicle suspension system is provided with a vehicle body position control device which restrains a stabilizer bar of the suspension system from turning and twisting about its axis during acceleration or deceleration in which the vehicle body tends to pitch due to rearward or forward weight transfer that causes the front end of the body to lower or lift, the device comprising a suspension control unit connected to the stabilizer bar and arranged to operate in a hydromechanical, electromechanical or hydroelectrical fashion responsive to acceleration or deceleration of the vehicle.

17 Claims, 5 Drawing Figures

SELF-LEVELLING VEHICLE SUSPENSION SYSTEM

The present invention relates to a suspension system of an automotive vehicle and, more specifically, to a vehicle body position control device for use in a vehicle suspension system of the particular type having a self-levelling property.

The self-levelling vehicle suspension system uses hydropneumatically operated suspension struts each connected between a suspended part of the vehicle body structure and each of the suspension members such as the lower control arms of the suspension system. The suspension strut is axially contractable and extensible in response to jounce and rebound of road wheels or to change in the load exerted on the vehicle body so that the vertical position or the level of the vehicle body over road surface is automatically adjusted when the vehicle encounters road irregularities or the load on the vehicle body is changed. Provision of the suspension struts of this nature contributes to reducing the sizes of the spring seats incorporated into the vehicle suspension system and is, for this reason, conducive to providing a soft ride.

As is well known in the art, the front end of a vehicle tends to lift over the road surface and the rear end tends to lower on the road surface during acceleration of the vehicle when a rearward weight transfer is brought about. This causes the rear suspension unit to move into jounce and the front suspension unit into rebound. During braking of the vehicle, on the contrary, the front end tends to lower and the rear end tends to lift due to forward weight transfer, causing the front suspension unit to jounce and the rear suspension unit to rebound. The rearward or forward weight transfer thus gives rise to a fore-and-aft pitch of the vehicle when the vehicle is accelerated or decelerated and such a tendency is pronounced in an automotive vehicle using the self-levelling suspension system which is faithfully responsive to the jounce and rebound of the road wheels. The present invention contemplates elimination of such a drawback inherent in a vehicle suspension system having self-levelling characteristics.

It is, therefore, an object of the present invention to provide a vehicle body position control device which is adapted to be incorporated into a self-levelling vehicle suspension system for restraining the pitching tendency of the vehicle body during acceleration or deceleration of the vehicle and yet enabling the suspension system to provide a soft ride when the vehicle is being driven at a constant or mildly varying velocity.

In accordance with the present invention, there is provided in a self-levelling suspension system of an automotive vehicle with at least one set of cooperative road wheels and including suspension members respectively connected to the road wheels, a lateral stabilizer bar connected between the suspension members and rotatable about its axis as the road wheels are caused to vertically move relative to the body structure of the vehicle and a hydropneumatically operated self-levelling strut connected between the vehicle body structure and each of the suspension members, a vehicle body position control device comprising a suspension control unit comprising a cylinder longitudinally movable relative to the vehicle body structure, a piston axially movable in the cylinder, an elongated connecting member fixedly connected at one end to the piston and pivotally connected at the other end to the above mentioned stabilizer bar, biasing means urging the piston into a predetermined equilibrium position in the cylinder and locking means having a first condition allowing the cylinder to longitudinally move relative to the vehicle body structure and a second condition holding the cylinder locked relative to the vehicle body structure, and control means responsive to the rate of change of the cruising velocity of the vehicle and operative to hold the locking means in the above mentioned first condition thereof when the rate of change of the cruising velocity of the vehicle is within a predetermined range and to actuate the locking means into the above mentioned second condition thereof when the rate of change of the vehicle velocity is outside the above mentioned predetermined range. The locking means may comprise a braking member having a first position disengaged from the cylinder for locking the cylinder relative to the vehicle body structure, and fluid-operated actuating means biased to hold the braking member into the first position thereof and operative to force the braking member into the second position thereof when actuated by working fluid, wherein the control means comprise an electric control circuit operative to produce an output signal when the rate of change of the cruising velocity of the vehicle is outside the previously mentioned predetermined range and solenoid-operated valve means actuated by the signal for providing fluid communication between the fluid-operated actuating means and a source of working fluid so that the actuating means is operated to actuate the braking member into the second position thereof. As an alternative, the locking means may comprise a plurality of substantially equidistantly spaced circumferential grooves formed in an outer peripheral wall of the cylinder and a solenoid-operated plunger unit which is stationary relative to the vehicle body structure and which includes a plunger movable between a first position disengaged from the cylinder and a second position engageable with the cylinder through one of the circumferential grooves in the cylinder, wherein the control means is electrically connected to the above mentioned solenoid-operated plunger unit and is operative to produce an output signal when the rate of change of the cruising velocity of the vehicle is outside the previously mentioned predetermined range so that the plunger unit is made operative to move its plunger into the second position thereof in response to the output signal from the control means. Still alternatively, the vehicle body position control device may comprise a housing which is stationary relative to the vehicle body structure and which longitudinally slidably receives the aforesaid cylinder therein for forming first and second chambers within the cylinder. In this instance, the locking means may comprise passage means for providing communication between the above mentioned first and second chambers in the housing, a body incompressible fluid in the first and second chambers and the passage means, and solenoid-operated valve means stationary relative to the vehicle body structure and having a first condition allowing the passage means to open and a second condition closing the passage means for blocking communication between the first and second chambers in the housing, wherein the control means is electrically connected to the solenoid-operated valve means and is operative to produce an output signal when the rate of change of the cruising velocity of the vehicle is outside the previously mentioned range so that the valve means is actuated into the second condition thereof in response to the output signal from the control signal.

The term "cooperative road wheels" above mentioned refer to road wheels having normal axes of rotation in line with each other (disregarding the toes and chambers of the road wheels). In a four-wheeled vehicle, for example, the cooperative road wheels may be the front steering road wheels or the rear driving road wheels.

The features and advantages of the vehicle body position control device according to the present invention will become more apparent from the following description taken in conjunction with the accompanying drawings in which like reference numerals and characters designate corresponding parts, elements and units throughout the figures and in which.

Figure 1:
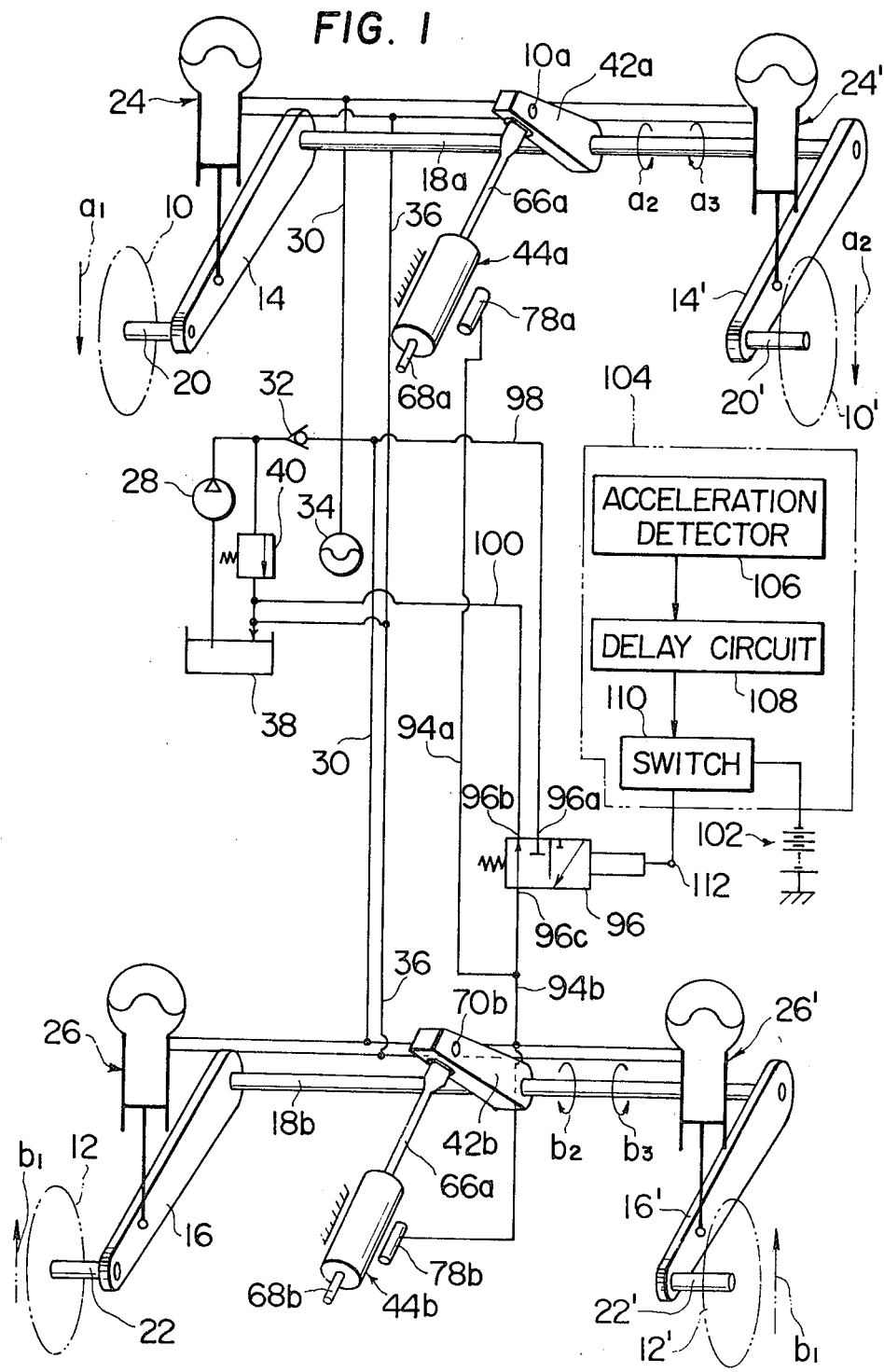
FIG. 1 is a schematic view showing a vehicle suspension system incorporating a preferred embodiment of the vehicle body position control device according to the present invention.

Referring to FIG. 1, the automotive vehicle incorporating the vehicle body position control device embodying the present invention is assumed, by way of example, to be of the four-wheeled type and is, thus, shown to have a pair of first cooperative road wheels 10 and 10' and a pair of second cooperative road wheels 12 and 12'. The first cooperative road wheels 10 and 10' are herein assumed to be the front steering road wheels and the second cooperative road wheels 12 and 12' are assumed to be the rear driving road wheels of the vehicle. The front road wheels 10 and 10' and the rear road wheels 12 and 12' have suspended thereon the body structure (not shown) of the vehicle by means of a suspension system which is shown to comprise a pair of front suspension arms 14 and 14', a pair of rear suspension arms 16 and 16' and front and rear stabilizer bars 18a and 18b. The front suspension arms 14 and 14' and the rear suspension arms 16 and 16' extend generally in parallel with the fore-and-aft direction of the vehicle while the front and rear stabilizer bars 18a and 18b extend generally at right angles to the fore-and-aft direction of the vehicle. The front suspension arms 14 and 14', assumed to be the lower control arms of the front suspension, are connected each at one end to the front road wheels 10 and 10' by means of front wheel spindles 20 and 20', respectively and at the other ends to the front stabilizer bar 18a. Likewise, the rear suspension arms 16 and 16' are connected each at one end to the rear road wheels 12 and 12' by means of rear wheel spindles 22 and 22', respectively, and at the other ends to the rear stabilizer bar 18b. As is well known in the art, the front or rear stabilizer bar 18a or 18b is caused to rotate and twist about its axis and is thus operative to lift the vehicle body structure and the opposite suspension unit as both of the front road wheels 10 and 10' or the rear road wheels 12 and 12' are brought into jounce.

The suspension system shown in FIG. 1 further comprises front hydropneumatically operated suspension struts 24 and 24' and rear hydropneumatically operated suspension struts 26 and 26'. Each of the front suspension struts 24 and 24' is connected between each of the front suspension arms 14 and 14' and the vehicle body structure and, likewise, each of the rear suspension arms 16 and 16' and the vehicle body structure. Each of the suspension struts 24, 24', 26 and 26' is automatically contracted or extended by means of a self-levelling valve incorporated into the strut in response to jounce or rebound of the associated road wheel as caused when the vehicle encounters road irregularities during cruising. The suspension strut of this nature is well known in the art and may be constructed and arranged as desired and, for these reasons, no detailed description regarding the construction and arrangement thereof will be herein incorporated.

The hydropneumatic suspension units 24, 24', 26 and 26' thus having any one of desired configurations are operated by working fluid which is supplied from an engine-driven fluid-feed pump 28 by way of a fluid supply circuit 30 through a one-way check valve 32 and a pressure accumulator 34 and is drained through a fluid discharge circuit 36 into a reservoir 38 from which the pump 28 sucks in fluid. Between the fluid-feed pump 28 and the one-way check valve 32 is disposed a pressure relief valve 40 having a drain port (not shown) in communication with the reservoir 38.

The front and rear stabilizer bars 18a and 18b have fixedly mounted thereon brackets 42a and 42b, respectively, projecting perpendicularly from the responsive stabilizer bars. Each of the brackets 42a and 42b is preferably located longitudinally to the vehicle in the middle of the stabilizer bar on which the bracket is mounted. The brackets 42a and 42b are respectively connected to front and rear suspension control units 44a and 44b, a preferred example of the detailed configuration of each of which is illustrated in FIGS. 2 and 3 wherein the control units 44a and 44b shown in FIG. 1 are commonly represented by a suspension control unit designated by reference numeral 44.

Figure 2:
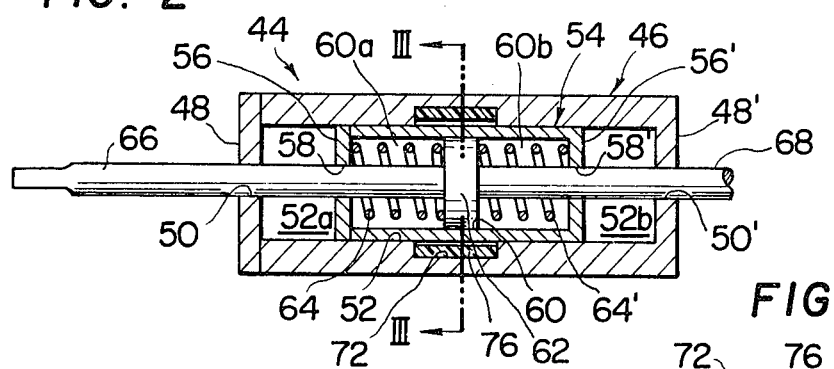
FIG. 2 is a longitudinal section of a suspension control unit forming part of the vehicle body position control device illustrated in FIG. 1.
Figure 3:
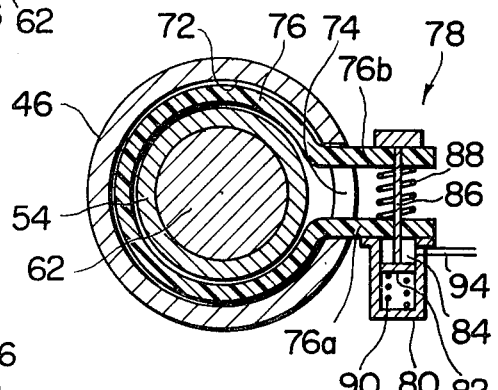
FIG. 3 is a cross section taken on line III—III of FIG. 2.

Referring to FIGS. 2 and 3, the suspension control unit 44 comprises a stationary cylindrical housing 46 having opposite end walls 48 and 48' formed with apertures 50 and 50', respectively, which are in line with each other in the axial direction of the housing 46. The housing 46 is securely connected to the body structure (not shown) of the vehicle and is thus held stationary relative to the vehicle body structure. The housing 46 is formed with a cylindrical bore 52 axially extending between the respective inner faces of the apertured end walls 48 and 48' of the housing 46 and has received therein a movable cylinder 54 which is axially slidable on the inner peripheral surface of the housing 46. The movable cylinder 54 has opposite end walls 56 and 56' forming in the cylindrical bore 52 of the housing 46, a first chamber 52a between the end wall 48 of the housing 46 and the end wall 56 of the cylinder 54 and a second chamber 52b between the end wall 48' of the housing 46 and the end wall 56' of the cylinder 54. The first and second chambers 52a and 52b thus formed in the cylindrical bore 52 of the housing 46 are contracted and extended as the cylinder 54 is axially moved between the inner faces of the end walls 48 and 48' of the housing 46. The end walls 56 and 56' of the movable cylinder 54 are formed with apertures 58 and 58', respectively, which are sized substantially equally to and located substantially in line with the apertures 50 and 50' in the end walls 48 and 48' of the housing 46. The movable cylinder 54 is formed with a cylindrical bore 60 longitudinally extending between the respective inner faces of the end walls 56 and 56' of the cylinder 54 and has received therein a piston 62 which is axially slidable on the inner peripheral surface of the cylinder 54. The piston 62 thus divides the cylindrical bore 60 of the cylinder 54 into first and second separate chambers 60a and 60b which are contracted and expanded as the piston 62 is axially moved between the inner faces of the end walls 56 and 56' of the cylinder 54. Within the first and second chambers 60a and 60b thus formed in the cylindrical bore 60 of the cylinder 54 are positioned first and second preload springs 64 and 64', respectively, each of which is assumed, by way of example, to be a helical compression spring as illustrated. The first preload spring 64 is seated at one end on one end face of the piston 62 and at the other end on the inner face of the end wall 56 of the cylinder 54, urging the piston 62 toward the opposite end wall 56' of the cylinder. On the other hand, the second preload spring 64' is seated at one end on the other end face of the piston 62 and at the other end on the inner face of the end wall 56' of the cylinder 54 and urges the piston 62 toward the opposite end wall 56 of the cylinder 54. The first and second preload springs 64 and 64' are selected to have substantially equal spring constants urging the piston 62 toward the opposite springs by substantially equal forces and, thus, constitute biasing means biasing the piston 62 toward an equilibrium position substantially equally spaced apart from the inner faces of the end walls 56 and 56' of the cylinder 54 as shown. A piston rod 66 extends from one end face of the piston 62, passes through the aperture 58 in the end wall 56 of the cylinder 54 and further through the aperture 50 in the end wall 48 of the housing 46, and projects longitudinally outwardly from the end wall 48 of the housing 46. Similarly, a guide rod 68 extends from the other end face of the piston 62, passes through the aperture 58' in the end wall 56' of the cylinder 54 and further through the aperture 50' in the end wall 48' of the housing 46, and projects longitudinally outwardly from the end wall 48' of the housing 46. As the piston 62 is longitudinally moved relative to the stationary housing 46 either independently of or together with the movable cylinder 54, the piston rod 66 and the guide rod 68 are longitudinally moved through the apertures 50 and 50' in the end walls 48 and 48', respectively, of the housing 46 and, as the cylinder 54 and the piston 62 are axially moved relative to each other, the piston rod 66 and the guide rod 68 are axially moved through the apertures 58 and 58' in the end walls 56 and 56', respectively, of the cylinder 54. The piston rod 66 is pivotally connected at its leading end to the previously mentioned bracket 42a or 42b on the front or rear stabilizer bar 18a or 18b by a pin 70a or 70b, respectively, as illustrated in FIG. 1, wherein 66a and 66b designate the respective piston rods of the front and rear suspension control units 44a and 44b, respectively. The guide rod 68 has a free leading end as indicated by 68a and 68b in FIG. 1.

Turning back to FIGS. 2 and 3, the stationary housing 46 has a circumferential groove 72 in a longitudinally middle portion of its inner peripheral wall and an opening 74 through which the groove 72 is open to the outside of the housing 46 as is seen in FIG. 3. A friction band 76 of, for instance, rubber is loosely received in this circumferential groove 72. The friction band 76 is operable between an expanded position radially spaced apart from the outer peripheral surface of the movable cylinder 54 and a contracted position in tight contact with the outer peripheral surface of the cylinder 54. The circumferential groove 72 has a width which is capable of being in surrounding relationship to part of the length of the movable cylinder 54 irrespective of the longitudinal position of the cylinder 54 relative to the housing 46 so that, when the friction band 76 is actuated into the contracted position, the movable cylinder 54 can be braked upon by the band 76 in whichsoever longitudinal position the cylinder 54 may happen to be relative to the housing 46 or, more exactly, to the circumferential groove 72 in the housing 46. As illustrated in FIG. 3, the friction band 76 has spaced parallel opposite end portions 76a and 76b which project radially outwardly from the housing 46 through the opening 74 in the housing for connection to a fluid-operated band actuating servo which is generally designated by reference numeral 78 in FIG. 3. The band actuating servo 78, which may be constructed and arranged as desired, is shown to comprise, by way of example, a cylinder 80 having a bore which is open at one end and a piston 82 which is longitudinally movable in the bore. The cylinder 80 is fixed to the body structure (not shown) of the vehicle and has fixedly connected to its open end one end portion 76a of the friction band 76 so that a pressurized fluid chamber 84 is formed between one face of the piston 82 and the outer face of the end portion 76a of the friction band 76. The pressurized fluid chamber 84, hermetically sealed by the end portion 76a of the friction band 76, is contracted and extended as the piston 82 is axially moved in the bore of the cylinder 80 in response to development of a fluid pressure in the chamber 84 or to release of the fluid pressure from the chamber 84 as will be described in more detail. The piston 82 is connected to a piston rod 86 which is axially passed through the end portion 76a of the friction band 76 and which is fixedly connected at its lead-end to the other end portion 76b of the friction band 76. The end portion 76b of the friction band 76 is, thus, moved toward and away from the end portion 76a of the band 76 when the piston 82 is moved back and forth in the bore of the cylinder 80. A preload spring 88 is seated between the respective inner faces of the end portions 76a and 76b of the friction band 76 for urging the end portion 76b away from the end portion 76a. Within the cylinder 80 is also positioned a preload spring 90 which urges the piston 82 toward a position moving the end portion 76b of the friction band 76 away from the end portion 76a of the band 76 through the piston rod 86. The preload springs 88 and 90 thus provide biasing means by which the friction band 76 is urged toward the expanded position thereof. The pressurized fluid chamber 84 in the cylinder 80 is in communication through a fluid passageway 94 with a solenoid-operated control valve 96 illustrated in FIG. 1, wherein the band actuating servos of the front and rear suspension control units 44a and 44b are designated by 78a and 78b and the fluid passageways leading to the servos 78a and 78b are designated by 94a and 94b, respectively.

Referring again to FIG. 1, the solenoid-operated control valve 96 has a fluid inlet port 96a in communication with the fluid supply circuit 30 through a passageway 98, a drain port 96b in communication with the fluid reservoir 38 through a passageway 100, and a control port 96c in communication with the above mentioned fluid passageways 94a and 94b leading to the band actuating servos 78a and 78b of the front and rear suspension control units 44a and 44b, respectively. The control valve 96 is biased to provide communication between the drain port 96b and the control port 96c and is arranged to provide communication between the fluid inlet port 96a and the control port 96c when the solenoid coil incorporated in the valve is energized from a d.c. power source 102 under the control of an electric control circuit which is generally designated be reference numeral 104.

The control circuit 104 comprises an acceleration detector 106 which is operative to deliver a signal in response to acceleration or deceleration produced in fore-and-aft direction of the vehicle. The output signal of the acceleration detector 106 is applied by way of a delay circuit 108 to a control element (not shown) of a normally-open switch 110 which is connected between the positive terminal of the d.c. power source 102 and an output terminal 112 of the control circuit 104. The output terminal 112 of the control circuit 104 is connected to the solenoid coil (not shown) of the solenoid-operated control valve 96.

Operation of the vehicle body position control device thus constructed and arranged will now be described with concurrent reference to FIGS. 1 to 3.

When the vehicle is cruising at a substantially constant or moderately varying velocity, the normally-open switch 110 is maintained open in the absence of the output signal from the acceleration detector 106 of the control circuit 104. The solenoid-operated control valve 96 therefore remains de-energized and is accordingly held in a condition providing communication between the drain port 96b and the control port 96c. This establishes communication between the passageway 100 leading to the fluid reservoir 38 and each of the fluid passageways 94a and 94b leading from the respective pressurized fluid chambers 84 (FIG. 3) of the actuating servos 78a and 78b of the front and rear suspension control units 44a and 44b. As a consequence, no fluid pressure is developed in the pressurized fluid chamber 84 of each of the actuating servos 78a and 78b, viz., the actuating servo 78 shown in FIG. 3 so that the end portion 76b of the friction band 76 is urged away from the end portion 76a of the band 76 by the combined forces of the preload springs 88 and 90. The friction band 76 is thus maintained in the expanded position illustrated in FIG. 2 and allows the movable cylinder 54 to axially move relative to the stationary housing 46 and to maintain its balanced position relative to the piston 62 by reason of the equilibrium between the forces exerted on the piston 62 by the preload springs 64 and 64'. The piston rod 66 is therefore permitted to freely move in axial direction relative to the stationary housing 46 and allows each of the front and rear stabilizer bars 18a and 18b (FIG. 1) to normally turn and twist about its axis when the vehicle encounters a bump and the front road wheels 10 and 10' and/or the rear road wheels 12 and 12' go into jounce and rebound. Thus, the suspension control units 44a and 44b impose no restraint on the motion of the stabilizer bars 18a and 18b and enable the suspension system to maintain its self-levelling performance during normal cruising of the vehicle.

When, now, brakes are applied during cruising of the vehicle and the vehicle is rapidly decelerated, the acceleration detector 106 of the control circuit 104 delivers an output signal and, after a certain interval which is prescribed on the delay circuit 108, closes the normally-open switch 110, energizing the solenoid-operated control valve 96 from the d.c. power source 102 through the switch 110. The control valve 96 is now actuated to provide communication between the fluid inlet port 96a and the control port 96c thereof so that the pressurized fluid delivered from the fluid-feed pump 28 is directed by way of the passageway 98, through the control valve 96 and further through the passageways 94a and 94b to the respective actuating servos 78a and 78b of the front and rear suspension control units 44a and 44b. A fluid pressure is consequently developed in the pressurized fluid chamber 84 of each of the actuating servos 78a and 78b, viz., the actuating servo 78 shown in FIG. 3. The fluid pressure acts on the piston 82 of the actuating servo 78 and forces the piston 82 to move in the cylinder 80 in a direction to urge the end portion 76b of the friction band 76 toward the end portion 76a of the band 76 against the opposing forces of the preload springs 88 and 90. This causes the friction band 76 to be radially contracted and brought into braking engagement with the movable cylinder 54 in the stationary housing 46. With the movable cylinder 54 thus held stationary relative to the housing 46 and accordingly to the body structure of the vehicle, the piston 62 is locked in situ by the forces of the preload springs 64 and 64' and as a consequence the piston rod 66 is prevented from longitudinally move relative to the body structure of the vehicle.

During braking, the front suspension unit is forced into jounce by the braking torque transferred thereto and, for this reason, the front road wheels 10 and 10' tend to lower as indicated by arrows $a_1$ in FIG. 1 and at the same time the rear road wheels 12 and 12' tend to lift as indicated by arrows $b_1$ in FIG. 1. This causes the front and rear stabilizer bars 18a and 18b to tend to turn and twist about their respective axes in directions indicated by arrows $a_2$ and $b_2$, respectively, in FIG. 1. Because, however, the piston rods 66a and 66b of the front and rear suspension control units 44a and 44b are restrained from being moved relative to the vehicle body structure during braking of the vehicle as discussed above, the front and rear stabilizer bars 18a and 18b are prevented or restrained from being twisted turned or raised.

When, conversely, the vehicle is accelerated the front road wheels 10 and 10' tend to lift and the rear road wheels 12 and 12' tend to lower, causing the front stabilizer bar 18a to tend to turn in the direction of arrow $a_3$ and the rear stabilizer bar 18b to tend to turn in the direction of arrow $b_3$ indicated in FIG. 1. Under this condition, the acceleration detector 106 of the control circuit 104 also delivers an output signal and, in the result, causes the friction band 76 to be tightened on the movable cylinder 54 in each of the suspension control units 44a and 44b so that the stabilizer bars 18a and 18b are also locked to the vehicle body structure.

When the vehicle velocity becomes constant, then the acceleration detector 106 ceases to deliver the output signal and causes the switch 110 to open. The solenoid-operated control valve 96 is therefore de-energized and restores the position providing communication between the drain port 96b and the control port 96c. The fluid under pressure in the pressurized fluid chamber 84 of each of the actuating servos 78a and 78b is drained off into the fluid reservoir 38 by way of each of the passageways 94a and 94b with the result that the friction band 76 is disengaged from the movable cylinder 54, which is accordingly permitted to longitudinally move relative to the stationary housing 46. The piston 62 and the piston rod 66 are now allowed to move relative to the vehicle body structure and allow each of the stabilizer bars 18a and 18b to turn and twist as usual when the vehicle encounters a bump during cruising.

Figure 4:
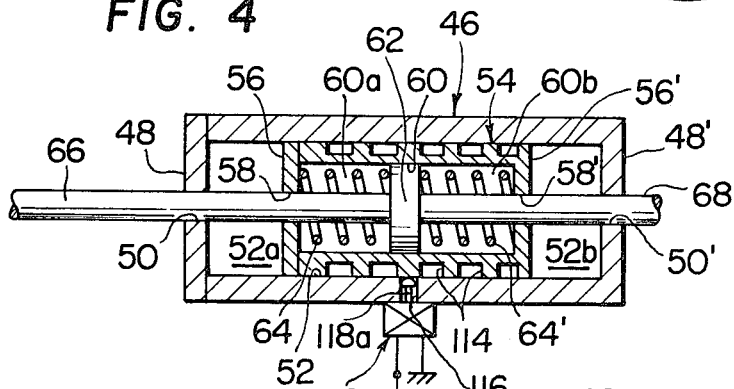
FIG. 4 is a view similar to FIG. 2 but shows an alternative example of the suspension control unit which may be incorporated into the device embodying the present invention.

FIG. 4 illustrates an alternative example of the suspension control unit 44 thus far described. The suspension control unit, now designated in its entirety by 44', is largely similar in construction to the suspension control unit 44 shown in FIGS. 2 and 3, thus comprising a stationary housing 46, a movable cylinder 54, a piston 62, first and second preload springs 64 and 64', a piston rod 66 and a guide rod 68. While, however, the locking means for locking the movable cylinder 54 in the suspension control unit 44 shown in FIG. 2 and 3 operate hydromechanically, the movable cylinder 54 of the suspension control unit 44' illustrated in FIG. 4 is locked and unlocked in an electromechanical fashion responsive direct to the output signal of the electric control circuit 104. The suspension control unit 44' shown in FIG. 4 is, thus, void of the friction band 76 and band actuating servo 78 incorporated into the unit 44 illustrated in FIGS. 2 and 3.

Referring to FIG. 4, the movable cylinder 54 is formed with a plurality of equidistantly spaced circumferential grooves 114 in its outer peripheral wall and the stationary housing 46 is formed with a through hole 116 in a longitudinally middle portion of its peripheral wall. Adjacent the hole 116 thus formed in the housing 46 is located a solenoid-operated plunger unit 118 having a movable plunger 118a projecting into the hole 116 in the housing 46. The plunger unit 118 has a solenoid coil connected to the output terminal 112 of the electric control circuit 104 illustrated in FIG. 1 so that the movable plunger 118a is held in a retracted position illustrated when the solenoid coil remains de-energized and is forced forward when the solenoid coil is energized. The plunger unit 118 is held stationary relative to the body structure (not shown) of the vehicle. When, thus, the vehicle is being driven at a constant or moderately varying velocity, the solenoid-operated plunger unit 118 remains de-energized in the absence of an output signal from the acceleration detector 106 of the control circuit 104 shown in FIG. 1. The movable plunger 118a of the plunger unit 118 is therefore maintained in its retracted condition disengaged from the movable cylinder 54, which is accordingly permitted to freely move within the stationary housing 46 so that each of the front and rear stabilizer bars 18a and 18b is capable of providing its usual functions. When, however, the vehicle is accelerated or braked during cruising, the acceleration detector 106 of the control circuit shown in FIG. 1 produces an output signal and causes the normally-open switch 110 to close. Current now flows from the d.c. power source 102 through the terminal 112 to the solenoid coil of the plunger unit 118 so that the movable plunger 118a is forced forward into one of the circumferential grooves 114 in the movable cylinder 54 as the movable cylinder 54 is axially moved relative to the stationary housing 46. The plunger 118a is thus brought into locking engagement with the cylinder 54 in the housing 46 through one of the circumferential grooves 114 in the cylinder 54 and, as a consequence, the piston 62 is restrained from being axially moved in the cylinder 54 relative to the stationary housing 54 by reason of the forces of the springs 64 and 64' acting on the piston 62. Each of the front and rear stabilizer bars 18a and 18b of the suspension system illustrated in FIG. 1 is therefore held stationary relative to the vehicle body structure and is restrained or prevented from being turned or twisted about its axis although the vehicle may encounter a bump. When the vehicle restores a fixed or moderately varying velocity, then the acceleration detector 106 of the control circuit 102 (FIG. 1) ceases the supply of the output signal and causes the solenoid coil of the plunger unit 118 to be de-energized. The movable plunger 118a of the plunger unit 118 is caused to retract from the circumferential groove 114 in the movable cylinder 54, which is therefore allowed to axially move in the stationary housing 46 and allows the piston 62 to freely move relative to the housing 46. Each of the front and rear stabilizer bars 18a and 18b of the suspension system shown in FIG. 1 is thus allowed to turn and twist about its axis as usual.

If desired, the circumferential grooves 114 in the movable cylinder 54 of the suspension control unit 44' above described may be replaced with a plurality of recesses or notches which are substantially equidistantly spaced apart from each other in a longitudinal direction of the cylinder 54. In this instance, means may be provided to prevent rotation of the cylinder 54 relative to the stationary housing 46 from its predetermined angular position having the array of the recesses or notches in alignment with the hole 122 in the housing 46.

Figure 5:
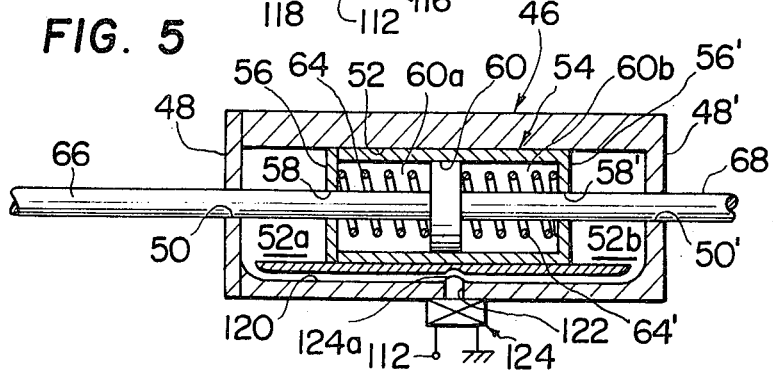
FIG. 5 is a view also similar to FIG. 2 but shows another alternative example of the suspension control unit incorporated into the device embodying the present invention.

FIG. 5 illustrates a modification of the suspension control unit 44' above described. The suspension control unit, now designated in its entirety by 44'', is constructed largely similarly to the suspension control unit 44' shown in FIG. 4 but is arranged to operate in a hydroelectrical fashion. In the suspension control unit 44'', the stationary housing 46 has formed in its longitudinal wall a passageway 120 providing communication between the first and second chambers 52a and 52b formed on both sides of the movable cylinder 54 in the housing 46. The housing 46 is further formed with a through hole 122 in a longitudinally middle portion of the longitudinal wall of the housing 46 and terminating in the above mentioned passageway 120. Adjacent to the hole 122 thus formed in the housing 46 is located a solenoid-operated valve unit 124 having a valve element 122a projecting into the hole 122. The valve unit 124 has a solenoid coil (not shown) connected to the output terminal 112 of the electric control circuit 104 shown in FIG. 1 so that the valve element 124a is held in a retracted position opening the passageway 120 when the solenoid coil is de-energized and is moved forward into a position closing the passageway 120 when the solenoid coil is energized. The valve unit 124 is held stationary relative to the vehicle body structure (not shown). The first and second chambers 52a and 52b and accordingly the passageway 120 in the stationary housing 46 are filled with a body of incompressible fluid such as liquid. The incompressible fluid is forced to flow between the first and second chambers 52a and 52b by way of the passageway 120 as the movable cylinder 54 is axially moved in either direction in the housing 46 and consequently one of the chambers 52a and 52B is axially contracted and the other is axially extended, provided the passageway 120 is maintained open.

During acceleration or deceleration of the vehicle, the solenoid coil of the valve unit 122 is energized from the d.c. power source 102 in the presence of an output signal from the acceleration detector 106 of the control circuit 104 shown in FIG. 1 so that the valve element 122a of the valve unit 122 projects forward into the position closing the passageway 120 in the stationary housing 46. The first and second chambers 52a and 52b are consequently isolated from each other and hold the movable cylinder 54 in a locked condition relative to the stationary housing 46 due to the incompressibility of fluid in each of the chambers 52a and 52b. The piston 62 is therefore restrained from being axially moved in the cylinder 54 by reason of the forces acting on the piston 62 and, as a consequence, each of the front and rear stabilizer bars 18a and 18b of the suspension system illustrated in FIG. 1 is locked to the vehicle body structure. When the vehicle restores a constant or moderately varying velocity, then the solenoid coil of the valve unit 122 is de-energized to cause the valve element 122a to retract into its position opening the passageway 120 providing communication between the first and second chambers 52a and 52b. The movable cylinder 54 is thus allowed to axially move in the stationary housing 46 and accordingly the piston 62 is allowed to move relative to the cylinder 54 and accordingly to the housing 46. Each of the stabilizer bars 18a and 18b of the suspension system is now allowed to turn and twist about its axis.

While a few embodiments of the vehicle body position control device according to the present invention have thus far been described with reference to the drawings, it should be borne in mind that such embodiments are merely illustrative of the gist of the present invention and may therefore be modified in numerous manners if desired. While, furthermore, the device embodying the present invention has been shown and described as being incorporated into a four-wheeled vehicle, it is apparent that the device according to the present invention may be provided in an automotive vehicle of other types.

What is claimed is:

1. In a self-levelling suspension system of an automotive vehicle with at least one set of cooperative road wheels and including suspension members respectively connected to said road wheels, a lateral stabilizer bar connected between said suspension members and rotatable about its axis as the road wheels are caused to vertically move relative to the body structure of the vehicle and a hydropneumatically-operated self-levelling strut connected between the vehicle body structure and each of said suspension members, a vehicle body position control device for locking said stabilizer bar relative to the vehicle body structure during acceleration or deceleration of the vehicle, said device comprising a suspension control unit comprising a cylinder axially movable relative to the vehicle body structure, a piston axially movable in said cylinder, an elongated connecting member fixedly connected at one end to said piston and pivotally connected at the other end to said stabilizer bar, biasing means urging said piston into a predetermined equilibrium position in said cylinder and locking means having a first condition allowing said cylinder to axially move relative to the vehicle body structure and a second condition holding the cylinder locked relative to the vehicle body structure, and control means responsive to the rate of change of the cruising velocity of the vehicle and operative to hold said locking means in said first condition thereof when the rate of change of the vehicle velocity is within a predetermined range and to actuate said locking means into said second condition thereof when the rate of change of the vehicle velocity is outside said predetermined range.

2. A vehicle body position control device as claimed in claim 1, in which said locking means comprise a braking member having a first position disengaged from said cylinder and a second position in braking engagement with said cylinder for locking the cylinder relative to the vehicle body structure, and fluid-operated actuating means biased to hold said braking member in said first position thereof and operative to force the braking member into said second position thereof when operated by fluid, said control means comprising an electric control circuit operative to produce an electric signal when the rate of change of the cruising velocity of the vehicle is outside said predetermined range and solenoid-operated valve means actuated by said signal for providing fluid communication between said fluid-operated actuating means and a source of working fluid so that the actuating means is operated to actuate said braking member into said second position thereof.

3. A vehicle body position control device as claimed in claim 2, in which said braking member consists of a friction band located around said cylinder and having opposite end portions connected to said fluid-operated actuating means, said friction band being expanded over said cylinder when held in said first position thereof and contracted on said cylinder when actuated into said second position thereof.

4. A vehicle body position control device as claimed in claim 3, in which said fluid-operated actuating means comprise a cylinder stationary relative to the vehicle body structure, a piston axially movable in said cylinder and defining in said cylinder of the actuating means a pressurized fluid chamber which is in communication with said source of working fluid over said valve means, a piston rod longitudinally projecting outwardly of the cylinder of the locking means from said piston of the locking means, one of said opposite end portions of said friction band being fixedly connected to said cylinder of the locking means and the other of the opposite end portions being fixedly connected to said piston rod for being moved toward and away from the former end portion as said piston of the locking means is longitudinally moved in said cylinder of the locking means, and biasing means for urging said opposite end portions of said friction band away from each other.

5. A vehicle body position control device as claimed in claim 3, further comprising a housing stationary relative to the vehicle body structure and longitudinally slidably receiving said cylinder therein, said housing having formed in an inner peripheral wall thereof a circumferential groove receiving said friction band therein.

6. A vehicle body position control device as claimed in claim 5, in which said circumferential groove is formed in a longitudinally middle portion of said inner peripheral wall of said housing.

7. A vehicle body position control device as claimed in claim 1, in which said locking means comprises a plurality of substantially equidistantly spaced circumferential grooves formed in an outer peripheral wall of said cylinder and a solenoid-operated plunger unit stationary relative to the vehicle body structure and including a plunger movable between a first position disengaged from said cylinder and a second position engageable with the cylinder through one of said circumferential grooves, said control means being electrically connected to said solenoid-operated plunger unit and operative to produce an output signal when the rate of change of the cruising velocity of the vehicle is outside said predetermined range, said plunger unit being operative to have its plunger moved into said second position thereof in response to said output signal from said control means.

8. A vehicle body position control device as claimed in claim 7, further comprising a housing stationary relative to the vehicle body structure and axially slidably receiving said cylinder therein, said housing having formed in a longitudinal wall thereof a hole through which said plunger is movable between said first and second positions thereof.

9. A vehicle body position control device as claimed in claim 8, in which said hole is formed in a longitudinally middle portion of said wall portion of the housing.

10. A vehicle body position control device as claimed in claim 1, further comprising a housing stationary relative to the vehicle body structure and axially slidably receiving said cylinder therein for providing therein first and second chambers across said cylinder, said locking means comprising passage means for providing communication between said first and second chambers in said housing, a body of incompressible fluid in said first and second chambers and said passage means, and solenoid-operated valve means stationary relative to the vehicle body structure and having a first condition allowing said passage means to open and a second condition closing said passage means for blocking communication between said first and second chambers in the housing, said control means being electrically connected to said solenoid-operated valve means and operative to produce an output signal when the rate of change of the cruising velocity of the vehicle is outside said predetermined range, said valve means being actuated into said second condition thereof in response to said output signal from said control means.

11. A vehicle body position control device as claimed in claim 10, in which said passage means comprises a passageway formed in a longitudinal wall portion of said housing.

12. A vehicle body position control device as claimed in claim 11, in which said housing is formed with a hole in said longitudinal wall portion thereof and in which said valve means have a valve element movable through said hole between a first position retracted from said passageway and a second position projecting into said passageway for closing the passageway.

13. A vehicle body position control device as claimed in claim 1, in which said cylinder has opposite end walls and in which said biasing means comprise first and second preload springs each of which is seated at one end on each of the end faces of said piston and each of said opposite end walls of said cylinder.

14. A vehicle body position control device as claimed in claim 1, further comprising a housing stationary relative to the vehicle body structure and axially receiving said cylinder therein.

15. A vehicle body position control device as claimed in claim 14, in which said housing has opposite end walls formed with respective apertures substantially in line with each other, said connecting member longitudinally passed through the aperture in one of said end walls of said housing.

16. A vehicle body position control device as claimed in claim 15, further comprising a guide rod projecting from said piston and longitudinally movably passed through the aperture in the other of said end walls of said housing.

17. A vehicle body position control device as claimed in claim 1, in which said control means comprise an electric control circuit comprising signal generating means responsive to the rate of change of the cruising velocity of the vehicle and operative to produce an output signal when the rate of change of the vehicle velocity is outside said predetermined range, a delay circuit connected to said signal generating means for passing said output signal after a predetermined interval the signal is delivered to the delay circuit, and switch means operative to actuate said locking means into said second condition thereof when triggered by the output signal passed through said delay circuit.

* * * * *